US005929889A

United States Patent [19]

Narita et al.

[11] Patent Number: 5,929,889

[45] Date of Patent: Jul. 27, 1999

[54] THERMAL TRANSFER RECORDING METHOD

[75] Inventors: Satoshi Narita; Mitsuhiro Hamashima, both of Tokyo-to, Japan

[73] Assignee: Dai Nippon Printing Co., Ltd., Tokyo-to, Japan

[21] Appl. No.: 08/883,617

[22] Filed: Jun. 26, 1997

[30] Foreign Application Priority Data

Jun. 28, 1996 [JP] Japan .................................... 8-186963

[51] Int. Cl.$^6$ ..................................................... G01D 15/10

[52] U.S. Cl. ........................... 347/171; 347/183; 347/194

[58] Field of Search ..................................... 347/171, 173, 347/194, 183, 221, 188; 503/227; 428/913, 423.1, 480; 358/298, 455, 456, 458

[56] References Cited

U.S. PATENT DOCUMENTS

| | | | |
|---|---|---|---|
| 5,066,961 | 11/1991 | Yamashita | 347/194 |
| 5,318,943 | 6/1994 | Ueno et al. | 503/227 |
| 5,726,122 | 3/1998 | Saito et al. | 503/227 |
| 5,731,263 | 3/1998 | Totsuka et al. | 503/227 |

FOREIGN PATENT DOCUMENTS

| | | | |
|---|---|---|---|
| 0329369 | 8/1989 | European Pat. Off. | B41J 3/20 |
| 0516247 | 12/1992 | European Pat. Off. | B41J 2/365 |
| 0577135 | 1/1994 | European Pat. Off. | B41J 2/365 |
| 0652114 | 5/1995 | European Pat. Off. | B41M 5/40 |
| 0656264 | 6/1995 | European Pat. Off. | B41M 5/00 |

OTHER PUBLICATIONS

Abstract of JP–A–5–169,848, Jul. 1993, Derwent Publications LTD. Database WPI, Section Ch. Week 9332, XP002038869.

Abstract of JP–A–5–270,152, Dainippon Printing Co. LTD., Oct. 1993, Derwent Publications LTD. Database WPI, Section Ch. Week 9346, XP002038870.

*Primary Examiner*—N. Le
*Assistant Examiner*—Anh T. N. Vo
*Attorney, Agent, or Firm*—Ladas & Parry

[57] ABSTRACT

An image receiving sheet comprises a paper substrate, a foamed layer formed on a paper substrate and a color receptor layer formed on the foamed layer. The image receiving sheet and an ink sheet are attached to each other in an overlapped fashion so that a printing energy from the thermal head is applied to all printing area at a time of image forming, the printing energy including an image-wise energy corresponding to image data and a background energy being applied to all printing area of the image receiving sheet and being defined in a look-up table, the image data is controlled by the look-up table.

According to a thermal transfer recording method of the present invention, a good quality image can be formed on the image receiving sheet.

10 Claims, 7 Drawing Sheets

| ORIGINAL GRADATION VALUE | C | M | Y | K |
|---|---|---|---|---|
| 0 | 3 | 3 | 3 | 3 |
| 1 | 4 | 4 | 4 | 4 |
| 2 | 5 | 5 | 5 | 5 |
| 3 | 6 | 6 | 6 | 7 |
| ⋮ | ⋮ | ⋮ | ⋮ | ⋮ |
| 105 | 105 | 110 | 100 | 99 |
| ⋮ | ⋮ | ⋮ | ⋮ | ⋮ |
| 252 | 252 | 244 | 250 | 254 |
| 253 | 253 | 246 | 251 | 255 |
| 254 | 254 | 249 | 252 | 255 |
| 255 | 255 | 250 | 253 | 255 |

FIG. 4

| ORIGINAL GRADATION VALUE | C | M | Y | K |
|---|---|---|---|---|
| 0 | 0 | 0 | 0 | 0 |
| 1 | 1 | 1 | 1 | 1 |
| 2 | 2 | 2 | 2 | 2 |
| 3 | 3 | 3 | 3 | 3 |
| ⋮ | ⋮ | ⋮ | ⋮ | ⋮ |
| 105 | 105 | 105 | 105 | 105 |
| ⋮ | ⋮ | ⋮ | ⋮ | ⋮ |
| 252 | 252 | 252 | 252 | 252 |
| 253 | 253 | 253 | 253 | 253 |
| 254 | 254 | 254 | 254 | 254 |
| 255 | 255 | 255 | 255 | 255 |

THERMAL TRANSFER RECORDING METHOD

BACKGROUND OF THE INVENTION

The present invention relates to a thermal transfer recording method, such as sublimation type thermal transfer recording method.

There are known various thermal transfer recording methods. Of these methods, a sublimation type thermal transfer recording method is well known. In this method, sublimation dye as color material is transferred from an ink sheet to an image receiving sheet by means of a thermal head heated according to an input signal to obtain an image thereon. Recently, this method is utilized for recording an information in many fields. According to this recording method, since dyes of sublimation type are used as color materials, the gradation density of an image can be adjusted freely, and a full color image can be obtained on an image receiving sheet. Since an image formed by dyes is very clear and has a good transparency, a high quality image with excellent reproducibility of half tone and gradation density equal to a silver salt photographic image can be recorded thereon.

As one of image receiving sheets used in the sublimation type thermal transfer recording method, a sheet which comprises a substrate formed of normal paper is proposed. A printed matter formed by printing on the sheet having the paper substrate described above has good characteristics as follows; (1) a brightness or feeling of the surface of a printed matter is nearly equal to that of a matter having an image which is formed through a normal printing method; (2) the image receiving sheet having the paper substrate can be bent while a conventional image receiving sheet having a synthetic paper substrate cannot be bent; (3) a printed matter can be book-bound and filed in a state where several sheets are piled. These characteristics make possible wide uses. In addition, the image receiving sheet can be produced at a reasonable cost since a normal paper for the image receiving sheet is cheaper than the synthetic paper substrate thereof.

However, a cushioning property of a paper and smoothness of the surface thereof are small, a high quality image and a high printing sensitivity cannot be obtained from the image receiving sheet having only a color receptor layer on a paper substrate. As the related arts of the above mentioned techniques, Japanese Laid-Open Publication No. 270147/1993 and No. 270152/1993 disclose an image receiving sheet in which a foamed layer comprising foam agent and resin is formed on a substrate to complement a cushion or a cushioning property and a heat insulation property of the substrate.

In the image receiving sheet with the foamed layer, an unevenness due to bubbles occurs on the surface of the color receptor layer to obstruct a tight contact between a thermal head and an image receiving sheet, a printing density and an image quality are decreased. In order to solve the problem thereof, the inventors proposed a method of smoothing the surface of the foamed layer in which a metallic roll with a specular finish is contacted with the surface of the foamed layer after forming the foamed layer on the paper substrate as disclosed in Japanese Laid-Open Publication No. 210968/1994. However, the above-mentioned method requires complicated production processes. In the above-mentioned method, although there is a secondary advantage that an unevenness of the surface of an image receiving sheet due to bubbles in the foamed layer can give a natural mat-like feeling to the surface of the image receiving sheet and a normal paper-like feeling, the advantage is lost by smoothing treatment on the surface of the foamed layer.

The inventors filed a patent application for an invention of an image receiving sheet in which a high quality printing image may be formed thereon by formation of a soft intermediate resin layer on the foamed layer even if an unevenness due to bubbles occurs on the surface of the color receptor layer, and in which the bubbles in the foamed layer are protected against a thermal shock and a mechanical shock by the thermal head.

However, even if the image receiving sheet having the soft intermediate resin layer on the foamed layer is used, there is easily caused degradation of a quality of a printed image formed at a low environment temperature or under an insufficient heating condition in a printer. As a concrete example of the above-mentioned problem, there is a case that a dropout in a printed area or a rough feeling on the surface is caused in a region having a low image density, so that letters or fine lines are broken off and become blurred. This tendency is remarkable in a single color image.

Although the cause of the above-mentioned phenomenons is not clear, it is presumed as follows; the composition material for a color receptor layer, an intermediate layer and a foamed layer in the image receiving sheet described above mainly comprises a polymer resin and an inorganic or organic addition agent of many kinds added to the polymer resin described above. Therefore, at a low temperature, a softness of the composition material with a resin is decreased to make worse a contact condition between the thermal head and the image receiving sheet. Accordingly, the dye cannot be transferred to a concave part of an uneven surface of the image receiving sheet to deteriorate an image quality.

The object of the present invention is to provide a thermal transfer recording method in which a high quality image can be obtained using the above-mentioned image receiving sheet even in the case of a low environment temperature.

SUMMARY OF THE INVENTION

In order to solve the above-mentioned problems, there is provided a method of thermal transfer recording of the present invention, in which a thermal transfer recording method comprising steps of: preparing an image receiving sheet comprising a paper substrate, a foamed layer and a color receptor layer; said foamed layer and said color receptor layer being disposed on one surface side of said paper substrate in this order, putting said image receiving sheet on an ink sheet in an overlapped fashion, and applying a printing energy from a thermal element to said ink sheet to form image on said image receiving sheet; said printing energy including an image-wise energy corresponding to image data and a background energy to be applied to all printing area of said image receiving sheet. In this case, it is preferable that the background energy is applied with respect to all printing colors or some optional printing colors, and the background energy is so determined so as not to cause the transfer of the color material at a minimum value of the image data. Further, it is preferable to correct the value of the background energy according to an environment temperature or a temperature of the thermal element such as a thermal head.

According to the method of thermal transfer recording of the present invention, even in the case of using an image receiving sheet having an uneveness on the surface thereof, a weak background energy is additionally applied with the use of the thermal element at the time of image forming to improve a tight contact between the thermal element and the image receiving sheet, an image or character having a low density, a fine line or the like can be satisfactorily transferred even if at a low temperature condition.

BRIEF DESCRIPTION OF THE DRAWINGS

FIG. 4 shows a look-up table used for measuring a basic characteristic of the printer;

DESCRIPTION OF THE PREFERRED EMBODIMENTS

Figure 1:
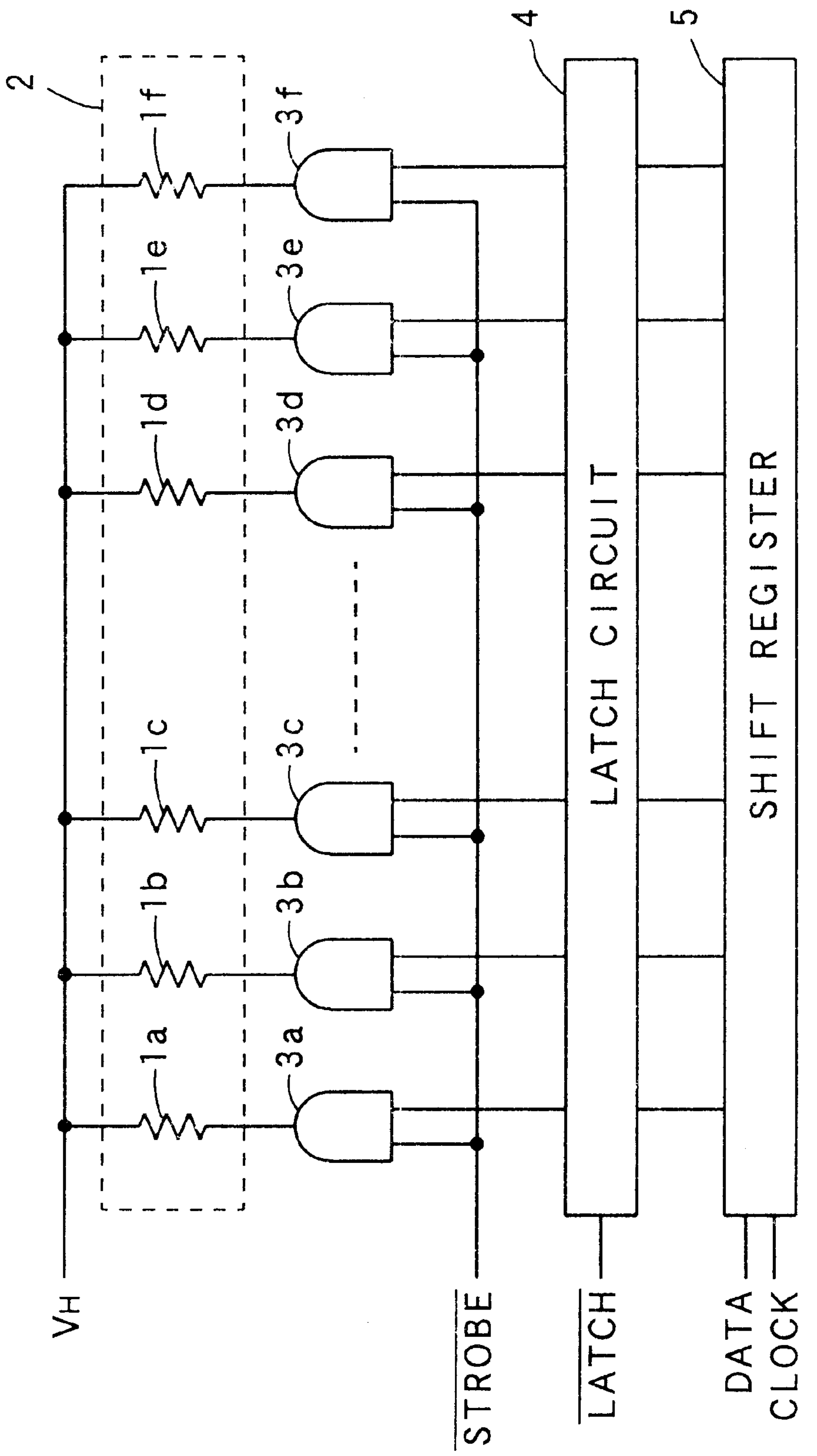
FIG. 1 shows an example of a driving circuit of a thermal head employed in the present invention.

FIG. 1 shows an example of a driving circuit of a thermal head employed in the present invention. In FIG. 1, the reference numerals 1*a,* 1*b,* 1*c,* . . . , 1*d,* 1*e,* and 1*f* denote heating elements of the thermal head. The reference numeral 2 denotes the thermal head which is provided with a plurality (several hundred per inch) of the heating elements aligned with each other on a single line. The heating elements are resistors which are heated by supplying a current therethrough. The reference numerals 3*a,* 3*b,* 3*c,* . . . , 3*d,* 3*e* and 3*f* are logic gates. Each output terminal of the logic gates is connected to one end of the heating element, and the logic gates function as switching elements to switch on and off the current flowing through the heating elements. Each of the other ends of the heating elements is connected to a power supply line $V_H$. Each logic gate has two input terminals, one receiving a strobe signal (STROBE) and the other being connected to a latch circuit 4.

The reference numeral 4 denotes a latch circuit, and the reference numeral 5 denotes a shift register. DATA, which is converted to be supplied to the thermal head 2, is inputted to the shift register 5 in synchronous with the clock signal (CLOCK). The DATA is a serial data. When the latch circuit 4 receives the active, i.e., "Low" level, control signal LATCH, the DATA inputted to the shift register 5 is simultaneously read out and held by the latch circuit 4, and is then outputted to the output terminals as parallel data. The outputs of the latch circuit 4 are connected to the other ends of the logic gates, respectively, and the logic gates become ON state to supply the current flows to the heating elements when the outputs of the latch circuit 4 and the strobe signals are both at "Low" level. The strobe signal becomes active only for a predetermined time period to allow the current to flow through the heating element.

As is clear from the above description, the DATA is binary data used to switch the respective heating elements. The binary data is converted from image data in order to make it suitable for the use by the thermal head. Specifically, the DATA is generated on the basis of an output obtained by processing the picture element value of image data and the comparison gradation value thereof through a comparator. The comparison gradation value is varied to generate new binary data every time when the strobe signal becomes active (Low). Every time when the comparison gradation value is increased step by step, the logic gate becomes ON state repeatedly for the times corresponding to the picture element value in the image data, thereby supplying the current flow through the heating element. When the strobe signal becomes active (Low) repeatedly and the comparison gradation value is varied for a predetermined range, a print operation for one line is completed.

There are two methods for exercising the present invention in the thermal printer which forms image according to the principle as described above. One method is to control the image data by using a look-up table, and the other method is to control the strobe signal itself.

First, the method of exercising the present invention using the look-up table will be described. In this method, an original image data is converted into a converted image data, and the converted image data is used for an output operation of the thermal printer. The data conversion of the image data is executed by referring to the look-up table. The image data is an aggregation of values of picture elements constituting the image. The picture element values may be represented by vectors C, M, Y and K having components of four ink colors, Cyan, Magenta, Yellow and Black, respectively (Sometimes only three ink colors "C, M, Y" may be used).

The data conversion using the look-up table may be expressed by the following equations:

$$Co=Fc(Ci)$$

$$Mo=Fm(Mi)$$

$$Yo=Fy(Yi)$$

$$Ko=Fk(Ki)$$

Here, Co, Mo, Yo and Ko are the values of the respective color components after the conversion. Fc, Fm, Fy and Fk represent functions or look-up tables of the values Ci, Mi, Yi and Ki before the conversion, respectively, and they are monotonously increasing functions or monotonously increasing look-up tables.

In the thermal transfer recording method according to the present invention, an image receiving sheet and an ink sheet are attached to each other in an overlapped fashion so that an energy from the thermal head is applied to all printing area of the ink sheet. Then, at the time of image forming, the image receiving sheet is applied with the printing energy including an image-wise energy corresponding to the image data and a background energy. The background energy is to be applied to all printing area, and it is small enough to avoid the color material transfer or the serious effect on the picture density.

Next, the description will be given of setting the background energy according to the thermal transfer recording method of the present invention to the look-up table. It is noted that the image receiving sheet according to the present invention is produced by sequentially forming at least the foamed layer and the color receptor layer on a paper substrate (descried later in detail).

Figures 2, 3:
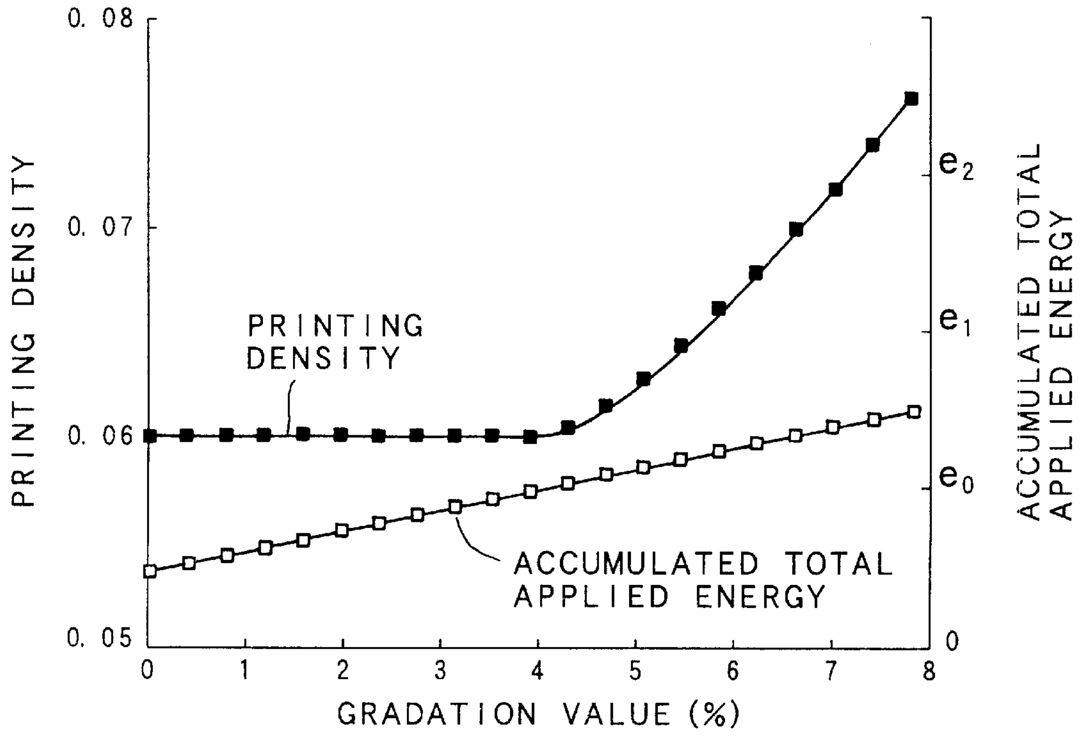
FIG. 2 shows an example of a look-up table used in a thermal printer according to the present invention.
FIG. 3 shows an example of the relationship between a printing density and an accumulated total applied energy with respect to a gradation value (%) applied by the thermal printer.

FIG. 2 shows an example of the look-up table used in the thermal printer according to the present invention. The look-up table is referred to in the following manner: If the original gradation value of the yellow ink component corresponding to a certain picture element in the original image data is 105 (on the leftmost column outside the table), the gradation value after the conversion of the yellow ink component corresponding to the picture element is 100 (on the Y-column).

In the present invention, the control of the gradation value is mainly performed at the area where the original gradation value (value of the component of the picture element) is low. For example, in the look-up table, the original gradation value of the image data "0" is converted to the value larger than "0" in the converted image data (C-, M-, Y- and K-columns). By this, the background energy according to the thermal transfer recording method of the present invention can be included and defined in the look-up table. In the look-up table shown in FIG. 2, the original gradation value "0" is converted to "3" (approximately 1% of the number of the whole gradation steps, i.e., 255). This is the printing condition in the case of the Embodiment 4 shown in the Table 1 described later.

In the above mentioned look-up table shown in FIG. 2, the background energy is applied with respect to all printing colors, i.e., C (Cyan), M (Magenta), Y (Yellow) and K (Black). Alternatively, the background energy may be applied with respect not to all printing colors but to some optional colors or to only a single color.

FIG. 3 shows an example of the relationship between the printing density and the accumulated total applied energy against the gradation value (%) applied by the thermal printer. Here, the gradation value (%) is given as the rate of the gradation value to the number of the gradation steps. As shown in FIG. 3, if the gradation value is "0", it is converted to "3" (approximately 1% of the gradation step number 255) to apply energy corresponding to 1% of the gradation step number. In this case, since the printing density does not vary, the base color of the paper does not change, thereby enabling the reliable transfer of low-density pictures, characters and fine lines.

In FIG. 3, the printing density starts increasing near the point where the gradation value exceeds 4%. The relationships of the printing density and the accumulated total applied energy shown in FIG. 3 are obtained in a condition of the room temperature, e.g. is 20° C. (standard condition). The gradation value (%) at which the printing density starts increasing varies dependently upon the ambient temperature and/or the thermal head temperature. Generally, when the ambient temperature or the thermal head temperature is high, the gradation value at which the printing density starts increasing shifts to the small value. Conversely, if the ambient temperature or the thermal head temperature is low, the gradation value at which the printing density starts increasing shifts to the large value. In this view, the gradation value for applying of the background energy is corrected so that the printing density can be controlled to perform reliable printing, despite the shift of the gradation value at which the printing density starts increasing due to the change of the ambient temperature and/or the thermal head temperature. The gradation value thus corrected, which includes the background energy, is set to the look-up table to determine the printing condition.

Figure 5:
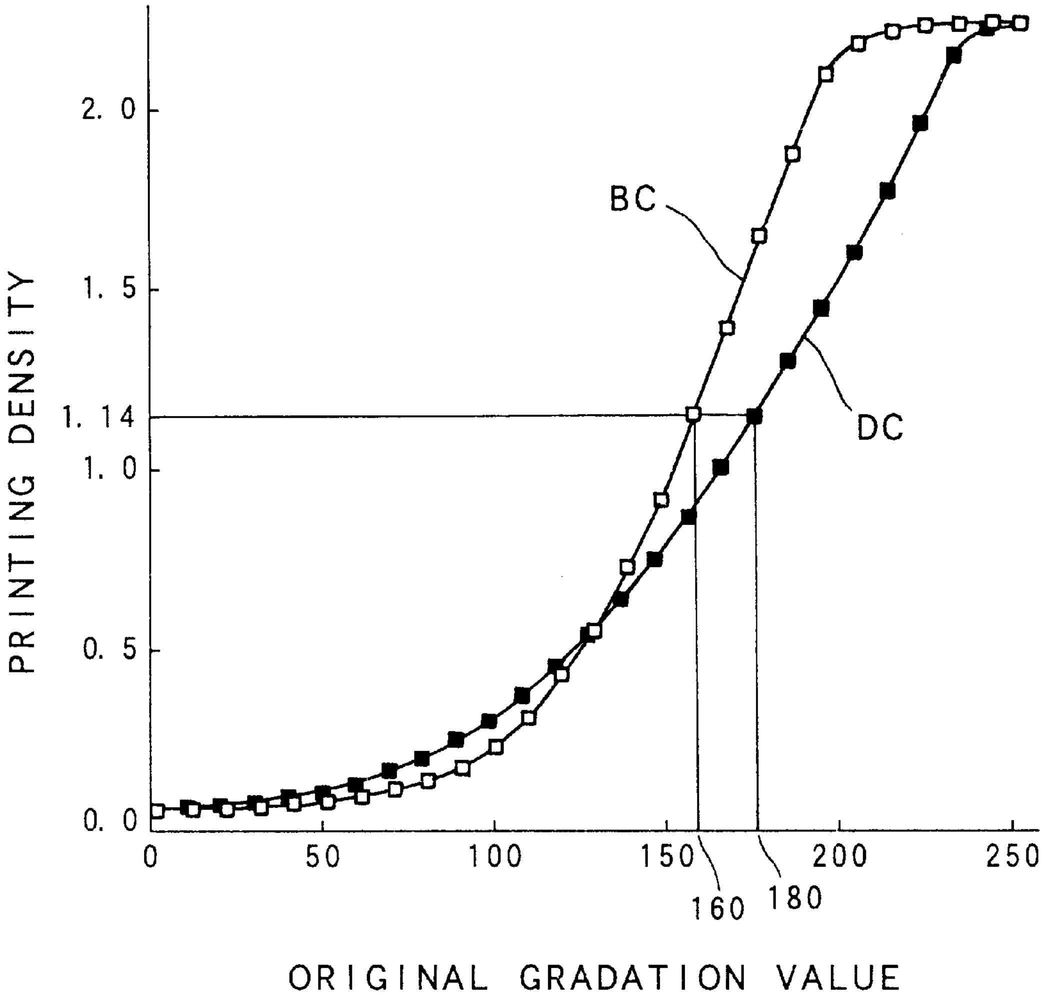
FIG. 5 shows a graph for the relationship (BC) between a printing density of an output image and an original gradation value in the look-up table, in which the original gradation value is directly set and a graph for the relationship (DC) between the original gradation value and a printing density which is desired actually to be obtained with the gradation value.

Next, the description will be given of the method of setting the look-up table in which the gradation values of all area are corrected. FIG. 4 shows a look-up table used for measuring the basic characteristic of the printer. In this look-up table, the converted gradation values (at C-, M-, Y- and K-columns) coincide with the original gradation values in the whole of the table. The printing is performed based on the look-up table to measure densities of the printed results obtained at respective gradation values. Based on the result of this measurement, the relationship (Basic Relationship) BC between the original gradation values, which are directly used for the printing conditions, and the densities of the printed results, shown in FIG. 5, is obtained. FIG. 5 further shows the relationship (Desired Characteristic) DC between the original gradation values of printing conditions and the densities, which is desired actually to be obtained with that original gradation values.

As is clear from the characteristic DC, even if the desired density at the gradation value 180 is 1.14, the density of the printed result according to the basic characteristic BC becomes 1.59 when the original (input) gradation value is set to 180. Therefore, the gradation value (160) at which the density of the printed result becomes 1.14 according to the characteristic BC is detected, and the detected value (160) is set in the look-up table as the converted (output) gradation value corresponding to the input gradation value 180. The setting in this manner is executed for all colors and all gradation values to determine data of the look-up table, thereby producing the desired characteristic DC.

Next, the description will be given of the method of controlling the strobe signal, i.e., the method of varying the strobe signal or the strobe data used as the basis for the generation of the strobe signal. In principle, this can be performed in the similar manner as varying the look-up table, however, in this case the accumulated total applied energy shown in FIG. 3 is varied. As described above, the control of the applied energy may be achieved by varying the accumulated time period in which the strobe signal is made active. For example, if the accumulated total applied energy rises up to $e_0$, the printing density does not vary and maintains 0.06. Therefore, by varying the strobe data so that the applied energy at the gradation value "0" is set to $e_0$ the present invention can be exercised.

The control of the applied energy may be achieved by varying the time period in which the strobe signal is made active. As described above, the operation to make the strobe signal active is executed for each gradation. By varying the time period in which the strobe signal is made active for each gradation, the applied energy can be varied.

Figure 6:
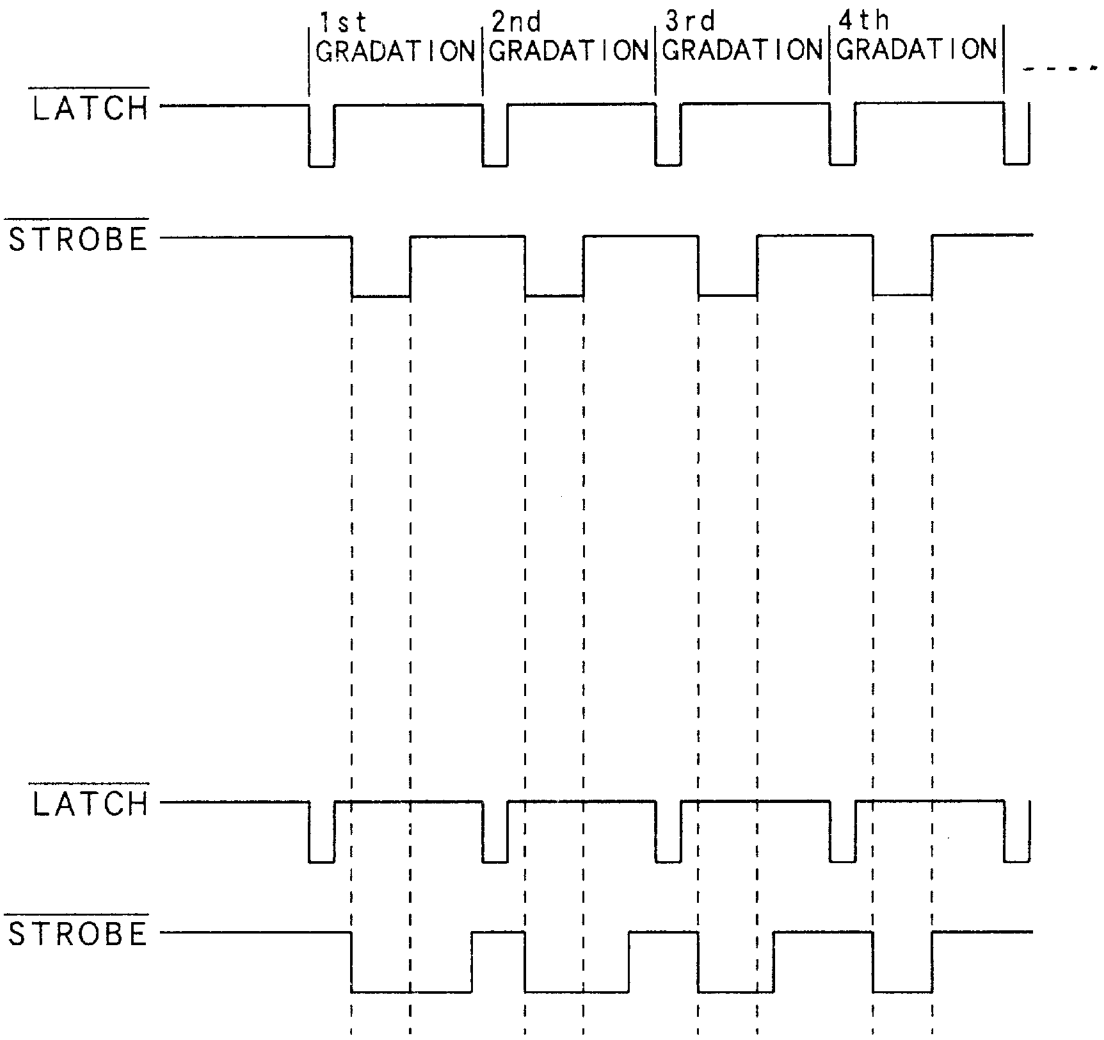
FIG. 6 is an explanatory diagram of the transition of a strobe signal.

FIG. 6 is an explanatory diagram of the transition of the strobe signal. The upper portion of FIG. 6 shows the case in which the pulse width of the strobe signal (i.e., active period) is not varied irrespective of the variation of the gradation values, and the lower portion of FIG. 6 shows the case in which the pulse width of the strobe signal is varied if the gradation values vary. In one embodiment of the present invention, unlike the case of the upper portion of FIG. 6 wherein the same pulse width is employed at all gradation values, the pulse width of the strobe signal is made long in the low gradation value and low-density area and the pulse width is gradually made shorter as the gradation value increases, as shown in the lower portion of FIG. 6. By applying relatively high energy which does not results in the density variation in low density area, the background energy according to the present invention can be applied.

Next, the description will be given of the correction of the background energy on the basis of the temperature of the thermal head. Generally, a sublimation-type thermal transfer printer has mechanism to maintain the temperature of the thermal head within a predetermined temperature range so as to avoid the variation of the printed density due to the variation of the thermal head temperature. Therefore, in the normal condition for use, it is not necessary to correct the background energy in response to the variation of the thermal head temperature. However, in the cases where the temperature control of the thermal head is insufficient due to the effect from the environment or where the temperature control of the thermal head is not executed due to suppressed cost of the printer, the background energy should be corrected.

In the correction of the background energy, the correction coefficient x based on the temperature of the thermal head is set to zero (x=0) in the normal thermal head temperature range, set to a maximum value in the minimum thermal head temperature with which the printer is operable, and set to an intermediate value in the intermediate temperature range.

Naturally, the correction coefficient x is a monotonously decreasing function with respect to the variation of the thermal head temperature. However, the exact feature of the function is determined in accordance with the characteristic (the printing characteristic against the thermal head temperature) of the printer or the thermal head used.

Next, the description will be given of the correction based on the ambient temperature. Assuming that the correction coefficient of the background energy based on the ambient temperature is y, it is set to zero (y=0) at the room temperature, e.g., 20° C., set to the maximum value at the minimum ambient temperature permitting operation of the printer, and set to the intermediate value at the intermediate temperature of them.

Naturally, the correction coefficient y is a monotonously decreasing function with respect to the variation of the ambient temperature. However, the exact feature of the function is determined in accordance with the characteristic (the printing characteristic with respect to the ambient temperature) of the printer or the thermal head used.

With the corrections based on the thermal head temperature and the ambient temperature described above, the background energy E may be corrected according to the following equations:

$$E=Eo*x*y,$$

wherein

E: Background energy,

Eo: reference value of the background energy,

*: operator indicating multiplication, x: correction coefficient based on the thermal head temperature, and y: correction coefficient based on the ambient temperature.

As described above, the above correction can be executed with the use of the look-up table or with the control of the strobe signal.

Figure 7:
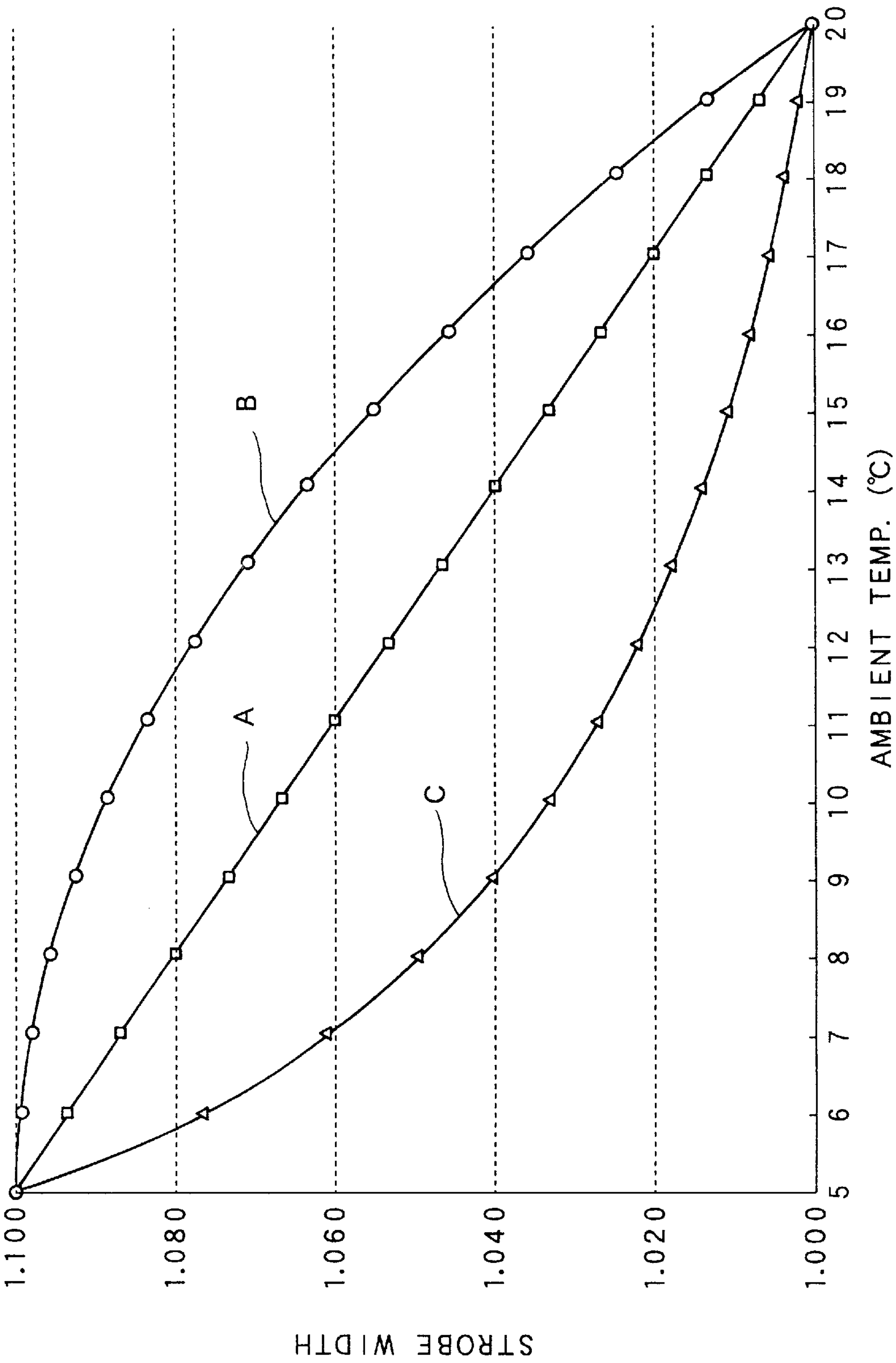
FIG. 7 shows an example of strobe data.

Next, by taking an example of the correction based on the ambient temperature, the control of the strobe signal will be described. FIG. 7 shows examples of strobe data. In FIG. 7, the horizontal axis represents the ambient temperature (°C.), and the vertical axis represents the pulse width of the strobe signal (relative value to a reference pulse width). In the example shown in FIG. 7, it is assumed that the normal ambient temperature is 20° C., and the width of the strobe signal at a certain gradation at that time is 1, and that the minimum ambient temperature at which the printer can be operated is 5° C. and the width of the strobe signal at the gradation at that time is 1.1. With respect to the strobe width in the intermediate ambient temperature, there are three cases that in response to the increase of the ambient temperature, the strobe width may linearly decrease as shown in the characteristic A in FIG. 7, or decrease in such a manner that the variation is small in the low-temperature area and the variation becomes larger as the temperature approaches the normal ambient temperature as shown in the characteristic B in FIG. 7, or decrease in such a manner that the variation is large in the low-temperature area and the variation becomes smaller as the temperature approaches the normal ambient temperature as shown in the characteristic C in FIG. 7.

The appropriate curving feature of the strobe width correction depends on the nature of the thermal head and the image receiving sheet used. This is true of the correction based on the thermal head temperature.

Figure 8:
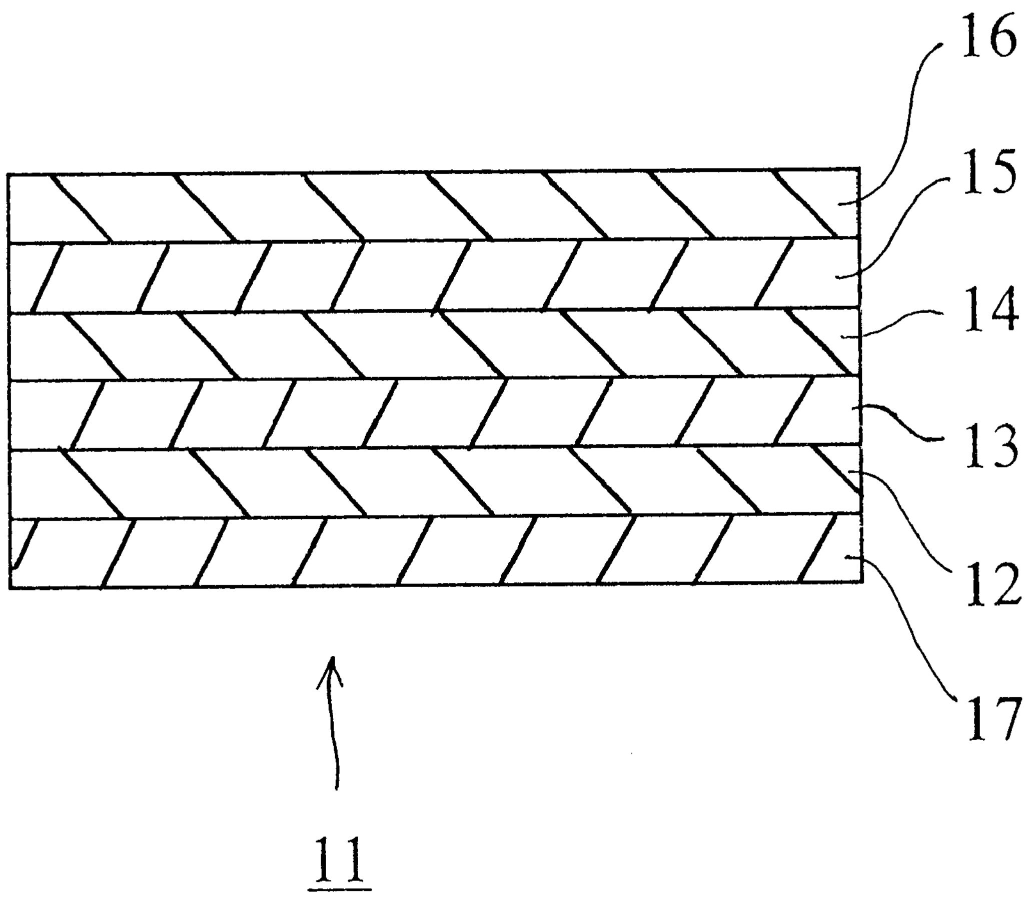
FIG. 8 shows a schematic partial cross sectional view of an example of an image receiving sheet used in the present invention.

Now, an image receiving sheet for thermal transfer printing used in the present invention will be explained hereinbelow. FIG. 8 shows a schematic partial cross sectional view of an example of an image receiving sheet used in the present invention. In FIG. 8, the image receiving sheet 11 comprises a paper substrate 12, an undercoat layer 13 formed on one surface of the paper substrate 12, a foamed layer 14 formed on the undercoat layer 13, an intermediate layer 15 formed on the foamed layer 14, a color receptor layer 16 formed on the intermediate layer 15 and a back surface layer 17 formed on the other surface of the substrate 12. In the present invention, the foamed layer and the color receptor layer are essential for the image receiving sheet, and another layers are optional.

The description of the paper substrate 12 will be given below. As the paper substrate 12 used in the image receiving sheet 11, the same paper substrate as that used in the conventional image receiving sheet may be used. There is, however, no specific restriction with respect to material for the substrate.

The examples of the paper substrate 12 may include wood free paper, art paper, light weight coated paper, slightly coated paper, coated paper, cast-coated paper, synthetic resin impregnated paper, emulsion impregnated paper, synthetic rubber latex impregnated paper, synthetic resin containing paper, thermal transfer paper and the like. Of the above-mentioned paper substrates, wood free paper, light weight coated paper, slightly coated paper, coated paper and thermal transfer paper are preferably used.

The thickness of the paper substrate 12 is 40 to 300 μm, preferably 60 to 200 μm. If the thickness of the image receiving sheet 11 is 80 to 200 μm, the image receiving sheet 11 obtained can hold a feeling of a regular or normal paper. In this case, the thickness of the paper substrate 12 is obtained by deducting the total thickness (approximately 30 to 80 μm) of all layers formed on the substrate, such as the undercoat layer 13, the foamed layer 14 on the undercoat layer 13, the intermediate layer 15 on the foamed layer 14 and the color receptor layer 16 on the intermediate layer 15 from the thickness of the image receiving sheet 11 described above. If the thickness of the paper substrate 12 is 90 μm or below, the paper substrate 12 is liable to have wrinkles at the time of absorbing water. However, the wrinkles thereof described above can be prevented by forming the undercoat layer 13 on the paper substrate 12.

The description of the color receptor layer 16 will be given below. The color receptor layer 16 comprises a resin with a high dyeing affinity as a main component and an additive such as a release agent or the like as occasion demands.

As typical examples of the resin with a high dyeing affinity, there will be listed up polyolefin resin such as polypropylene or the like; halogenated resin such as polyvinyl chloride, polyvinylidene chloride or the like; vinyl resin such as polyvinyl acetate, polyacrylic ester or the like;

copolymer of halogenated resin and vinyl resin; polyester resin such as polyethylene terephthalate, polybutylene terephthalate or the like; polystyrene resin; polyamide resin; copolymer of olefin such as ethylene, propylene or the like and vinyl monomer; ionomer resin; cellulose derivative; and mixture of the above resins. Of resins described above, polyester resin, vinyl resin and these mixture are preferably used.

A release agent may be added to the resin in order to prevent a thermal fusion between the color receptor layer 16 and the ink sheet at the time of forming images. As typical examples of the release agent, there will be listed up silicone oil, phosphate plasticizer and fluoride. Of release agents described above, silicone oil is preferably used. As typical examples of the silicone oil, there will be list up various kinds of modified silicone oils, namely, epoxy modified silicone, alkyl modified silicone, amino modified silicone, carboxyl modified silicone, alcohol modified silicone, fluoride modified silicone, alkyl-aralkyl polyether modified silicone, epoxy polyether modified silicone, polyether modified silicone, hydrogen modified silicone or the like. Of modified silicone oils, a reaction product between vinyl modified silicone oil and hydrogen modified silicone oil is preferably used. A total amount of the added release agents is preferably 0.2 to 30 wt.parts per resin of 100 wt.parts for forming the color receptor layer.

The color receptor layer and the other layer described below can be formed by a conventional known method such as roll coating, bar coating, gravure coating, gravure reverse coating or the like. A coating amount of the color receptor layer is preferably 0.5 to 10 g/m$^2$ (based on solid content). Unless otherwise state, a coating amount of the present invention is a value based on solid content.

The description of the undercoat layer 13 will be given below. It is preferable to form the undercoat layer 13 on the paper substrate 12. The undercoat layer 13 can prevent the penetration of a foamed layer coating solution into the paper substrate 12, when the foamed layer coating solution is applied on the paper substrate 12. Therefore, it is possible to form the foamed layer 14 at a requested thickness on the undercoat layer 13. The formation of the undercoat layer 13 can give a higher expanding ratio when the foamed layer 14 is formed and a high cushioning property to the whole part of the image receiving sheet. As the expanding ratio of the foamed layer 14 becomes high, the amount of the foamed layer forming solution to be applied on the undercoat layer 13 can be less, and therefore it is economical.

As typical examples of the resin for forming the undercoat layer 13, there will be listed up acrylic resin, polyurethane resin, polyester resin, polyolefin resin and these modified resin or the like.

In case that an undercoat layer coating solution comprising water solvent is applied on the paper substrate 12, a water absorbing property of the surface of the paper substrate 12 becomes irregular since the paper substrate 12 is used. Further, the paper substrate 12 is liable to have wrinkles or undulations to cause a bad influence on a feeling of the paper substrate 12 or a quality of an image formed on the image receiving sheet 11. This tendency is remarkable in case that the thickness of the paper substrate 12 is 100 $\mu$m or below.

Therefore, a coating solution dissolved or diffused not in water, but in an organic solvent is preferably used for forming the undercoat layer 12. As typical examples of the organic solvent used for the undercoat layer coating solution, there will be listed up toluene, methyl ethyl ketone, isopropanol, ethyl acetate, butanol and other industrial organic solvents which are conventionally used.

In order to improve the coating aptitude of the undercoat layer 13, to improve an adhesion between the undercoat layer 13 and the paper substrate 12 or the foamed layer 14 (especially in case that water-series foam agent is used for the foamed layer), and to improve a whiteness, it is preferable to add extending pigment such as talc, calcium carbonate, titanium oxide, barium sulfate or the like.

A coating amount of the undercoat layer is preferably 1 to 20 g/m$^2$ (based on solid content). When a coating amount is less than 1 g/m$^2$, the effect of the undercoat layer as described above cannot be obtained. When a coating amount is more than 20 g/m$^2$, the effect thereof is not improved any more, a feeling of the paper substrate 12 changes to a feeling such as a synthetic resin substrate, and this is uneconomical.

The description of the foamed layer 14 formed on the undercoat layer 13 will be given below. The foamed layer 14 mainly comprises a resin and a foam agent. Since the foamed layer 14 has high cushioning property, the image receiving sheet obtained has a high printing sensitivity even if paper is used as a substrate.

As typical examples of the resin for forming the foamed layer 14, there will be listed up urethane resin, acrylic resin, methacrylic resin, modified olefin resin or the like and these mixture. The foamed layer 14 may be formed by applying a solution which is dissolved and/or dispersed in an organic solvent or a water solvent on the undercoat layer 13. As a foamed layer coating solution, a water-series coating solution without influence on the foam agent is preferable. As typical examples of material for composing the coating solution, there will be listed up water soluble coating solution and water dispersing solution, that is, styrene butadiene rubber (SBR) latex, urethane-series emulsion, polyester emulsion, vinyl acetate emulsion, vinyl acetate copolymer emulsion, acrylic copolymer emulsion such as acrylic, acrylic styrene or the like, vinyl chloride emulsion or the like, and dispersion solutions containing the above resin. In case that microsphere mentioned below is used as a foam agent, of the resins described above, vinyl acetate emulsion, vinyl acetate copolymer emulsion, acrylic copolymer emulsion such as acrylic, acrylic styrene or the like is preferably used.

In the resins described above, a glass transition point, a softness and a property for forming film may be easily controlled by changing the kinds or mixing ratios of monomers to be copolymerized. Therefore, those resins are suitable for the foamed layer 14 because desired properties for the foamed layer 14 may be obtained without a plasticizer or an assistant agent for forming a film, a color of the foamed layer 14 changes hardly in any environment after the formation of the foamed layer 14, and a property of the foamed layer 14 changes hardly with the passage of time.

Of the resins described above, SBR latex is not preferable because, in general, its glass transition point is low to cause a blocking, and a yellowing is liable to occur after the formation of the foamed layer or at the time of preservation.

Urethane-series emulsion is liable to influence on a foam agent since many urethane emulsions include solvents of NMP (N-methyl-2-pyrolidone), DMF (N,N-dimethylformamide) and the like. Therefore, it is not preferable.

Polyester emulsion, polyester dispersion and vinyl chloride emulsion are liable to decrease an expanding capability of the microsphere since those glass transition points are high in general. Some of those are soft because of addition of plasticizer. Therefore, those coating solutions are not preferable.

An expanding capability of the foam agent is greatly influenced by a hardness of the resin used. In order to expand the foam agent up to a suitable expanding ratio, it is preferable to use resin having a glass transition point in a range from −30 to 20° C., or resin having the minimum temperature of 20° C. or below for forming a film. In a resin having a glass transition point of 20° C. or above, a softness of the resin lacks in softness, and an expanding capability of the foam agent lowers. In a resin having a glass transition point of −30° C. or below, a blocking occurs due to an adhesion between the foamed layer and the back surface of the paper substrate, when the substrate is wound up on a roll after the formation of the foamed layer. When the image receiving sheet is cut, the resin of the foamed layer is adhered onto the edge of a cutter to cause a bad appearance and irregular sizes. In a resin having the minimum temperature of 20° C. or above for forming a film, there may occur an inferior in forming a film, that is, a cracking on the surface of the form layer.

As typical examples of the foam agent, there will be listed up foam agents of decomposition type such as dinitrosopentamethylene tetramine, diazoaminobenzene, azobisisobutyronitrile, azodicarbonamide and the like, which is decomposed by heat and generates a gases such as oxygen, carbon dioxide, nitrogen or the like, microsphere which is a microcapsule formed by wrapping a solution of a low boiling point such as butane or pentane within resins such as polyvinylidene chloride resin or polyacrylonitrilic resin, and another known form agent. Of the foam agents described above, the microsphere is preferably used. Those foam agents are expanded by heating of the foamed layer. The foamed layer thus obtained has a high cushioning property and a high heat insulating property.

A preferable amount of the foam agent is 0.5 to 100 wt.parts per the resin of 100 wt.parts (based on solid content) for forming the foamed layer. When an amount is less than 0.5 wt.parts, a cushioning property of the foamed layer is low not to obtain effects of the formation of the foamed layer. When an amount is more than 100 wt.parts, mechanical strength of the foamed layer lowers as the void ratio of the foamed layer becomes too great after expansion, and the foamed layer is useless. Further, loss of smoothness on the surface of the foamed layer is given, and a bad influence is caused on an appearance of the image receiving sheet and a quality of the printed images.

The whole thickness of the foamed layer is preferably 30 to 100 μm. When a whole thickness is less than 30 μm, the foamed layer lacks in a cushioning property or a heat insulating property. When a whole thickness is more than 100 μm, a strength of the foamed layer lowers without the increase of the effects of the foamed layer.

As particle size of the foam agent, a volume average particle size before expansion is preferably 5 to 15 μm, and that after expansion is preferably 20 to 50 μm. When a volume average particle size is less than 5 μm before expansion or less than 20 μm after expansion, a cushioning property of the foamed layer lowers. When a volume average particle size is more than 15 μm before expansion or more than 50 μm after expansion, the surface of the foamed layer becomes uneven to give a bad influence on a quality of the printing image formed.

Of the foam agents, it is preferable to use microsphere of low temperature expanding type with an optimum expanding temperature of 140° C. or below, at which is given the highest expanding ratio by heating for 1 minute, a softening temperature of a particle wall of 100° C. or below and a starting expansion temperature of 100° C. or below to lower a heating condition for foaming. Thereby, the occurrence of wrinkles and curls by heating for expansion can be effectively prevented.

The microsphere with a low expanding temperature can be obtained by adjusting a mixture amount of the thermoplastic resin such as polyvinylidene chloride resin, polyacrylonitrilic resin or the like for forming the particle wall. The volume average particle size of the microsphere obtained is 5 to 15 μm.

The foamed layer using the microsphere described above has advantages as follows: bubbles obtained by expanding are independent from each other; bubbles can be formed only through a simple process such as heating; a thickness of the foamed layer can be easily controlled by adjusting the mixture amount of the microsphere.

However, as the microsphere described above is weak to an organic solvent, the particle wall of the microsphere is eroded by the organic solvent if the coating solution comprising the organic solvent is used for the foamed layer, and an expanding capability lowers. Therefore, in case that the microsphere described above is used, a water-series coating solvent without an organic solvent to erode the particle wall such as ketone solvent e.g., acetone, methyl ethyl ketone or the like, esters solvent e.g., ethyl acetate or the like, and lower alcohol e.g., methanol, ethanol or the like is preferably used.

As examples of the water-series coating solution, there will be listed up solutions using a water soluble or dispersive and a resin emulsion, that is, preferably acrylic styrene emulsion or modified vinyl acetate emulsion.

In case that the foamed layer is formed by using the water-series coating solution, a coating solution containing solvent of a high boiling point and a high polarity such as NMP, DMF, cellosolve or the like as supplementary solvent, supplementary agent for making a film or plasticizer, gives an influence upon the microsphere. Therefore, it is necessary to know an addition amount of a high boiling point solvent and a composition of a water soluble resin to be used and to make sure whether or not those conditions may give a bad influence on the micro-capsule.

The description of the intermediate layer 15 formed on the foam layer 14 will be given below. When the foam agent in the foamed layer described above is expanded, the surface of the foamed layer becomes uneven at an order at several tens μm. Therefore, if the color receptor layer 16 is directly formed on the foamed layer 14, the surface of the color receptor layer 16 becomes uneven of several tens μm. An obtained images on the image receiving sheet comprising the foamed layer described above have a lot of voids and dropout in the printed area, are not clear, and do not have a high resolution.

Conventionally, to solve the problems described above, there has been proposed processes for forming the image receiving sheet in which smoothing treatment such as calendering treatment by application of heating or pressure is done; a large amount of resin for decreasing the unevenness is applied on the foamed layer, and a color receptor layer and a foamed layer are laminated on the peelable substrate to make a first laminated substrate so that the laminated substrate is further laminated on another substrate to make a second laminated substrate, and then, only the peelable substrate is peeled off from the second laminated substrate.

However, those methods described above have problems such as an increase of process number for manufacturing, requirement of a large amount of coating resin, and requirement of other materials.

In order to eliminate the unevenness of the surface on the foamed layer, it is preferable to form an intermediate layer 15 composing a soft and an elastic material. By the formation of the intermediate layer, the image receiving sheet without influencing on the quality of the image can be given even if the surface of the color receptor layer have an unevenness.

The intermediate layer 15 is formed of a resin having a high softness and elasticity. As typical examples of the resins for forming the intermediate layer 15, there will be listed up urethane resin, vinyl acetate resin, acrylic resin, and copolymer thereof, and the mixture resin thereof.

The glass transition point of each resin described above is preferably −30 to 10° C. In a resin having a glass transition point lower than −30° C., an adhesive property is high to cause a blocking between the intermediate layer 15 and the back surface of the paper substrate 12 and an inferior sheet when the image receiving sheet is cut. In a resin of the glass transition point higher than 10° C., the resin lacks in softness, and, therefore, the problems described above cannot be solved.

If a coating solution for forming the color receptor layer 16 described above comprises an organic solvent, the organic solvent erodes the foamed layer 14, so that a cushioning property or the like owing to the foamed layer 14 cannot be given to the image receiving sheet. Therefore, the problems described above can be solved in such a manner that the intermediate layer 15 between the foamed layer 14 and the color receptor layer 16 is formed from the water-series coating solutions. The water-series coating solutions do not include an organic solvent, for example, ketone such as acetone or methyl ethyl ketone; ester such as ethyl acetate; lower alcohol such as methanol or ethanol. As typical examples of the water-series coating solutions, it is preferable to use a solution with water soluble or dispersive resin, or an emulsion of resin, especially, acrylic styrene emulsion.

As an additive in the intermediate layer 15 or the foamed layer 14, an inorganic pigment such as calcium carbonate, talc, kaolin, titanium oxide, zinc oxide or other known inorganic pigment and a fluorescent whitening agent may be used to give a hiding property and a whitening property thereto and to adjust a feeling of the image receiving sheet. A compounding ratio of the inorganic pigment or the fluorescent whitening agent described above is preferably 10 to 200 wt.parts per the resin of 100 wt.parts based on solid content. When a compounding ratio is less than 10 wt.parts, an effect of the pigment or the agent cannot be sufficiently obtained. When a compounding ratio is more than 200 wt.parts, it lacks in dispersion stability of the pigment or the agent, and an original capability of the resin cannot be sufficiently obtained.

A coating amount of an intermediate layer coating solution is preferably 1 to 20 $g/m^2$ based on solid content. When a coating amount is less than 1 $g/m^2$, the function for protecting voids in the foamed layer 14 cannot be sufficiently obtained. When a coating amount is more 20 $g/m^2$, an effect of the heat insulating property and the cushioning property of the foamed layer 14 cannot be sufficiently obtained.

The description of the back surface layer 17 will be given below. In the case of the above paper substrate, if a plurality of resin layers are formed on the front surface of the paper substrate and the back surface thereof is left exposed, the image receiving sheet may be curled due to the influence of temperature and humidity in an environment. Therefore, it is preferable to form a curl prevention layer mainly comprising a resin having a water-holding capacity such as polyvinylalcohol, polyethylene glycol or the like on the back surface side of the substrate.

The back surface layer 17 with a slippery property may be formed on the opposite side of the dye receptor layer of the image receiving sheet in conformity with a carrying path of the sheet. In order to give a slippery property to the back surface layer 17, an inorganic or organic filler may be dispersed in the resin for forming the back surface layer 17. As resins for forming the back surface layer 17, known resins or a mixture of those resins may be used.

To the back surface layer 17, a sliping or release agent such as silicone may be added. A coating amount of the back surface layer 17 is preferably 0.05 to 3 $g/m^2$.

As an ink sheet for the thermal transfer printing on the image receiving sheet described above, a sublimation type ink sheet can be used. In addition, a heat fusible type coloring ink sheet may be used. The heat fusible type ink sheet is provided with a heat fusible ink layer comprising heat fusible binder and pigment, and that ink layer is transferred to a receiving material by heating.

As means for giving a thermal energy at the time of the thermal transfer printing, any known means may be used. For example, a recording time is controlled by a recording apparatus such as a thermal printer (e.g., "M2710" manufactured by SUMITOMO 3M Inc.) to give a thermal energy in the range of 5 to 100 $mJ/mm^2$. Thus, an image is formed.

EXAMPLES

Now, the present invention will be described hereinbelow in more detail with reference to the following experiments to form an image receiving sheet used in the prevent invention.

A coated paper of weight of 104.7 $g/m^2$ (Product name: "New V Matt" manufactured by MITSUBISHISEISI Inc.) was used as a paper substrate 12. On one surface of the paper substrate 12, an undercoat layer having the following composition was formed at a coating amount of 5 $g/m^2$ by gravure coating method, and dried by a hot wind drier.

| <Coating solution composition for undercoat layer> | |
|---|---|
| Acrylic resin( "EM" manufactured by SOKEN KAGAKU Inc.): | 100 wt. parts |
| Precipitation barium sulfate( "#300" manufactured by SAKAI KAGAKU Inc.): | 30 wt. parts |
| Toluene: | 400 wt. parts |

Then, on the thus formed undercoat layer 13, a foamed layer having the following composition was formed at a coating amount of 20 $g/m^2$ by gravure coating method, and dried for 1 minute at 140° C. by a hot wind drier to expand a microsphere.

| <Coating solution composition for foamed layer> | |
|---|---|
| Styrene-Acrylic resin emulsion( "RX941 A" manufactured by NIHON CARBIDE KOGYO Inc.): | 100 wt. parts |
| Microsphere( "F30VS" manufactured by MATSUMOTO YUSI KAGAKU Inc., Expansion starting temp.: 80° C.): | 10 wt. parts |
| Water: | 20 wt. parts |

Then, on the thus formed foamed layer 14, an intermediate layer having the following composition was formed at a coating amount of 5 $g/m^2$ by gravure coating method, and dried by a hot wind drier.

| <Coating solution composition for intermediate layer> | |
|---|---|
| Acrylic resin emulsion( "FX337C" manufactured by NIHON CARBIDE KOGYO Inc.): | 100 wt. parts |
| Water: | 20 wt. parts |

Then, on the thus formed intermediate layer 15, a color receptor layer having the following composition was formed at a coating amount of 3 $g/m^2$ by gravure coating method, and dried by a hot wind drier.

| | |
|---|---|
| <Coating solution composition for color receptor layer> | |
| Vinyl chloride-vinyl acetate copolymer( "#1000D" manufactured by DENKI KAGAKU KOGYO Inc.): | 100 wt. parts |
| Amino modified silicone( "X22-349" manufactured by SHINETSU KAGAKU KOGYO Inc.): | 3 wt. parts |
| Epoxy modified silicone( "KF-393" manufactured by SHINETSU KAGAKU KOGYO Inc.): | 3 wt. parts |
| Methyl ethyl ketone/Toluene (1/1): | 400 wt. parts |

Then, on the other surface of the paper substrate 12, a back surface layer having the following composition was formed at a coating amount of 0.05 $g/m^2$ by gravure coating method, and dried by a cold wind drier.

| | |
|---|---|
| <Coating solution composition for back surface layer> | |
| Polyvinyl alcohol( "Kurarepoval124" manufactured by KURARE Inc.): | 2 wt. parts |
| Water: | 100 wt. parts |

The image receiving sheet 11 prepared as described above is used in order to transfer an image through the thermal transfer recording method in the present invention. In the present invention, at the time of an image forming, a printing energy including an image-wise energy corresponding to the image data and a background energy small enough to avoid the color material transfer or a serious influence on the picture density is applied to the image receiving sheet.

The optimum value of the background energy is determined in accordance with the degrees of an unevenness and a softness of the surface of an image receiving sheet. When the image receiving sheet have a high softness and a small uneveness, a small background energy is enough to obtain a preferable image. When the image receiving sheet have a small softness and a large uneveness, a large background energy is desired for obtaining the preferable image.

The softness of the surface of the image receiving sheet depends on a temperature. At a low temperature, the softness thereof tends to decrease. Therefore, it is preferable to correct the value of the background energy in such a manner that it is large when the temperatures of environment and the thermal head are low, and it is a small when those the temperatures are high.

As described above, it is preferable to correct the value of the background energy in accordance with each condition. Although we cannot simply say which value is good, when a remarkably large background energy is applied, dye transfer is not properly done, and color tones of the transferring image and the surface on the image receiving sheet are changed. The value of the background energy is preferably 0.1 to 10%/100%, that is, 0.1 to 10% of the maximum value of the image signal.

When a color printer is used for printing, three colors of yellow (Y), magenta (M) and cyan (C) or four colors of yellow (Y), magenta (M), cyan (C) and black (K) are printed successively on the receptor layer 16 of the image receiving sheet 11. The background energy may be applied with respect to only a single printing color, e.g., yellow, or with respect to some optional printing colors, e.g., yellow and magenta. Although any above mentioned method is effective, it is more preferable that a small background energy is applied with respect to all printing colors than that a large background energy is applied with respect to a single printing color to obtain a high quality of an image. When the background energy is applied with respect to only a single printing color, a proper transfer of dye is rarely achieved. As a result, a hue of the image receiving sheet changes. However, when the background energy is applied with respect to all printing colors, although a brightness of the image receiving sheet is liable to change little, a hue of the image receiving sheet hardly changes. Therefore, in view of these points, it is more desired that the background energy is applied with respect to a plurality of colors rather than to a single color. Especially, it is desired to apply the background energy with respect to all colors.

The thermal transfer recording method of the present invention using the image receiving sheet described above will be described hereinbelow in more detail with reference to the following experiments to transfer an image. The conditions of the thermal transfer recording are described from (1) to (5) as follows;

(1) Sublimation type thermal transfer color printer; "M2710" (manufactured by SUMITOMO 3M Inc.)

(2) Ink sheet;
Color ribbon (4 colors of Y,M,C,K) for "M2710" printer use (manufactured by SUMITOMO 3M Inc.)

(3) Printed image;
K (black) single color—low concentration(25%/100%) with solid printing.
Fine line of K (black) single color (10%/100%) with one dot width or two dots width.
Character image of K (black) single color (100%/100%)

(4) Method of applying the background energy;
With respect to each image described above, the image signal of 1 to 3%/100% is applied with respect to all printing colors or a plurality of colors in all printing area.

(5) Printing and evaluation;
An image is formed by applying background energy and by use of the above mentioned color printer and the above mentioned ink sheet, and the image receiving sheet described above at an environment temperature of 5° C., and the image obtained is evaluated by organoleptic test of visual observation. The change of the base color (Lab-value) of the image receiving sheet at the time of applying a background energy is measured by a colorimeter ("SPM-50" manufactured by GURETAGU Inc.).

The thermal transfer recording method according to the present invention is performed under the conditions described above to obtain evaluation result shown in TABLE 1.

TABLE 1

| | | | | | F | | | |
|---|---|---|---|---|---|---|---|---|
| | A | B | D | E | G | L | a | b |
| E-E 1 | Y:1% | X | X | XX | No obs. | 94.28 | 0.10 | 1.41 |
| E-E 2 | Y:1%, M:1% | Δ | ○Δ | Δ | No obs. | 94.07 | 0.13 | 1.43 |
| E-E 3 | Y:1%, M:1%, C:1% | ○ | ○ | ○Δ | No obs. | 93.92 | 0.08 | 1.40 |
| E-E 4 | Y:1%, M:1%, C:1%, K:1% | — | ⊙ | ⊙ | No obs. | 93.91 | 0.11 | 1.35 |
| E-E 5 | Y:3% | X | ΔX | X | No obs. | 94.17 | 0.03 | 1.57 |
| E-E 6 | Y:1%, M:1% | ○Δ | ○ | ○Δ | No obs. | 93.98 | 0.14 | 1.56 |

TABLE 1-continued

| A | B | D | E | F: G | F: L | F: a | F: b |
|---|---|---|---|---|---|---|---|
| E-E 7 Y:1%, M:1%, C:1% | ○ | ○ | ○ | No obs. | 93.88 | 0.08 | 1.52 |
| E-E 8 K:1% | — | Δ | X | No obs. | 94.05 | 0.13 | 1.21 |
| E-E 9 K:3% | — | ○Δ | ΔX | No obs. | 94.09 | 0.12 | 1.23 |
| C-E 1 No applied | XX | XX | XXX | — | 94.37 | 0.15 | 1.21 |

Environment Temperature for Recording = 5° C.
E-E: Experiment Example
C-E: Comparative Example
A: Applied Conditions of Background Energy.
B: Low Density Solid and Harshness.
D: Reproducibility of Character.
E: Reproducibility of Fine Line.
F: Change of Base Color of Image Receiving Sheet Itself.
G: Visual Observation.
Y: Yellow
M: Magenta
C: Cyan
K: Black
L: L-value
a: a-value
b: b-value
⊚: Excellent
○: Good
○Δ: Very Well
Δ: Well
ΔX: Not Well
X: Bad
XX: Very Bad
XXX: Out of Question As shown in TABLE 1, when a background energy is not applied (Comparative Example 1), the evaluation results of the recorded image are bad. On the other hand, when a background energy is applied with respect to some printing colors, the evaluation results of the recorded image are apparently good (Experiment Example 2, 3, 4, 6, 7).

When a background energy is applied with respect to only a single printing color, although the evaluation results of the recorded image are not remarkably good, the evaluation results thereof (Experiment Example 1, 5, 8, 9) are better than those without the background energy (Comparative Example 1).

Especially, when a background energy is applied with respect to the black printing color, the reproducibility of a character and a fine line is prominent (Experiment Example 4, 8, 9).

In the results in TABLE 1, the base color of the image receiving sheet itself hardly changes.

As described above, the quality of the conventional image formed on an image receiving sheet which comprises a soft intermediate layer formed on a foamed layer was bad in the case of a low environment temperature or the insufficient heat of the printer. However, according to the present invention as described above in detail, the good quality image can be obtained by use of the image receiving sheet described above even if at a low temperature condition.

The background energy applied in the present invention is so determined that the transfer of the color material does not occur at the minimum value of the image formation signal. Therefore, a good quality image without dirty portions of the image receiving sheet itself can be obtained. Since the background energy is applied with respect to some optional printing colors or all printing colors, means for applying the background energy can be selected freely corresponding to practical restrictions.

When the value of the background energy is corrected corresponding to an environment temperature, a proper background energy can be given in a wide range of environment temperature. When the value of the background energy is corrected corresponding to the temperature of thermal head in the printer, a proper background energy can be given in a wide range of temperature thereof.

What is claimed is:

1. A thermal transfer recording method, using a gradation value at which a printing density starts an increasing shift to a large value, comprising the steps of:

forming an image receiving sheet comprising a paper substrate, a foamed layer and a color receptor layer, said foamed layer and said color receptor layer being disposed on one surface side of said paper substrate in this order;

putting said image receiving sheet on an ink sheet; and applying a printing energy from a thermal element to said ink sheet to form an image on said image receiving sheet, said printing energy including an image-wise energy corresponding to image data and a background energy to be applied to all printing area of said image receiving sheet;

wherein said background energy has a magnitude determined by a correction of a gradation value so as to be sufficient to avoid a color material transfer and avoid a serious effect on a density of the formed image and said background energy is corrected according to a following equation:

$$E=Eo*x*y$$

wherein E: background energy; Eo: reference value of the background energy; *: operator indicating multiplication; x: correction coefficient based on the thermal element temperature; y: correction coefficient based on an ambient temperature.

2. The thermal transfer recording method as claimed in claim 1, wherein said background energy is applied with respect to at least one color to be printed.

3. The thermal transfer recording method as claimed in claim 1, wherein said background energy is applied with respect to all colors to be printed.

4. The thermal transfer recording method as claimed in claim 1, wherein said ink sheet is for a sublimation thermal transfer recording.

5. The thermal transfer recording method as claimed in claim 1, wherein said thermal element is part of a thermal head in a printer.

6. The thermal transfer recording method as claimed in claim 1, wherein said paper substrate is one selected from a group consisting of wood free paper, light weight coated paper, slightly coated paper, coated paper and thermal transfer paper.

7. The thermal transfer recording method as claimed in claim 1, wherein said image receiving sheet comprises said paper substrate, said foamed layer, an intermediate layer and said color receptor layer; said foamed layer, said intermediate layer and said color receptor layer being disposed on one surface side of said paper substrate in this order.

8. The thermal transfer recording method as claimed in claim 7, wherein said image receiving sheet comprises said paper substrate, an undercoat layer, said foamed layer, said intermediate layer, said color receptor layer and a back surface layer; said undercoat layer, said foamed layer, said intermediate layer and said color receptor layer being disposed on one surface side of said paper substrate in this order, and said back surface layer being disposed on the other surface side of said paper substrate.

9. The thermal transfer recording method as claimed in claim 1, wherein said background energy is included and defined in a look-up table and the image data is controlled by the look-up table.

10. The thermal transfer recording method according to claim 1, wherein said background energy is controlled by changing strobe data, and the image data is controlled by varying a time period in which the strobe data is made active.

* * * * *